US008150235B2

(12) United States Patent
Hamilton

(10) Patent No.: US 8,150,235 B2
(45) Date of Patent: Apr. 3, 2012

(54) METHOD OF HOME MEDIA SERVER CONTROL

(75) Inventor: Chris Hamilton, Montclair, NJ (US)

(73) Assignee: Intel Corporation, Santa Clara, CA (US)

( * ) Notice: Subject to any disclaimer, the term of this patent is extended or adjusted under 35 U.S.C. 154(b) by 2610 days.

(21) Appl. No.: 10/071,571

(22) Filed: Feb. 8, 2002

(65) Prior Publication Data

US 2003/0154299 A1    Aug. 14, 2003

(51) Int. Cl.
*G11B 27/00* (2006.01)
*H04N 7/173* (2011.01)

(52) U.S. Cl. ........................... 386/278; 725/105
(58) Field of Classification Search ............. 386/1, 46, 386/52–55; 725/32, 46
See application file for complete search history.

(56) References Cited

U.S. PATENT DOCUMENTS

| 5,436,653 | A  | * | 7/1995 | Ellis et al. ........................ 725/22 |
| 6,757,482 | B1 | * | 6/2004 | Ochiai et al. .................. 386/278 |
| 7,032,177 | B2 | * | 4/2006 | Novak et al. .................. 715/723 |
| 7,055,166 | B1 | * | 5/2006 | Logan et al. .................... 725/32 |
| 2002/0073220 | A1 | * | 6/2002 | Lee .................................. 709/231 |
| 2003/0093790 | A1 | * | 5/2003 | Logan et al. .................... 725/38 |
| 2011/0126246 | A1 | * | 5/2011 | Thomas et al. ................. 725/93 |

OTHER PUBLICATIONS

Andrew Tokmakoff et al., "Home Media Server content management," Proceedings of SPIE, vol. 4519, pp. 168-179, XP009017768, 2001.*

* cited by examiner

*Primary Examiner* — William C Vaughn, Jr.
*Assistant Examiner* — Asher Khan
(74) *Attorney, Agent, or Firm* — Pillsbury Winthrop Shaw Pittman LLP

(57) ABSTRACT

New forms of entertainment can result from this method of selecting, identifying, and storing by a media producer of multi-media content as files to a storage medium within an editing platform. Generating, using an editing software program, a set of instructions and data for assembly of an edited program, the edited program including specified segments from the files of the multi-media content. Assembling the specified segments using the set of instructions and data to form the edited program. Storing the edited program on the editing platform. Analyzing, using a software program, endpoint frames of each segment in the edited program, the analysis resulting in analysis data stored on the editing platform. Distributing the information to a home media server. Emulating assembly of the edited program by the home media server using the information and a home media server editing program, the assembled edited program being stored in the home media server.

19 Claims, 3 Drawing Sheets

Home Media Server Control

Home Media Server Control

METHOD OF HOME MEDIA SERVER CONTROL

BACKGROUND OF THE INVENTION

1. Field of the Invention

The present invention generally relates to home media servers. More particularly, the present invention relates to home media server content management and processing.

2. Discussion of the Related Art

Consumers are beginning to own home media servers or set-top boxes (such as TiVo) that have powerful media processing capabilities. These units are capable of downloading content over networks and digitally recording many hours of movies, television programs, music, game software, advertisements, etc. Consumers will soon own large libraries of television and other content for their personal enjoyment.

Already, the set-top box is becoming a popular adjunct to TV viewing. Acting as an intelligent personal video recorder, a set-top box can "pause" broadcast video, receive TV listings, and store and display directed advertising. The several technologies that enable the disclosed invention, including video editing software, are well known to those skilled in the art.

Media producers today produce content and then distribute it to the public. Television producers shoot video, record voiceovers, license historical clips, etc., and distribute the resulting edited content to the public via various media. Likewise, music is produced in a studio, using live musicians or licensed musical samples, and distributed on compact discs or digitally over the Internet. These are costly methods of media production.

Therefore, there is a need for an improved method of producing media products at low cost that enables consumers to re-use home content as raw materials.

DETAILED DESCRIPTION

The present invention allows instructions from media producers to control home media servers in a way that adds value to home content libraries. A home media server, such as a set-top box, stores, manages, and processes consumer content, such as movies and music. The present invention enables media producers to provide valuable media server content management and content processing software to the public. In one embodiment, messages to video editing software running on a home media server allow the intelligent playback of home content in new and appealing combinations.

New forms of entertainment can result from this method of selecting, synchronizing, editing, mixing, and displaying home content. With the present invention, home recordings become an open source of content on top of which media producers are able to create new layers of media products for the public. Generally, this method enables the processing and combining of home content and software within a home media server to allow new applications, games, and entertainment to be displayed. In particular, robust methods of home content recognition, selection, segmentation, and synchronization are disclosed.

Figure 1:
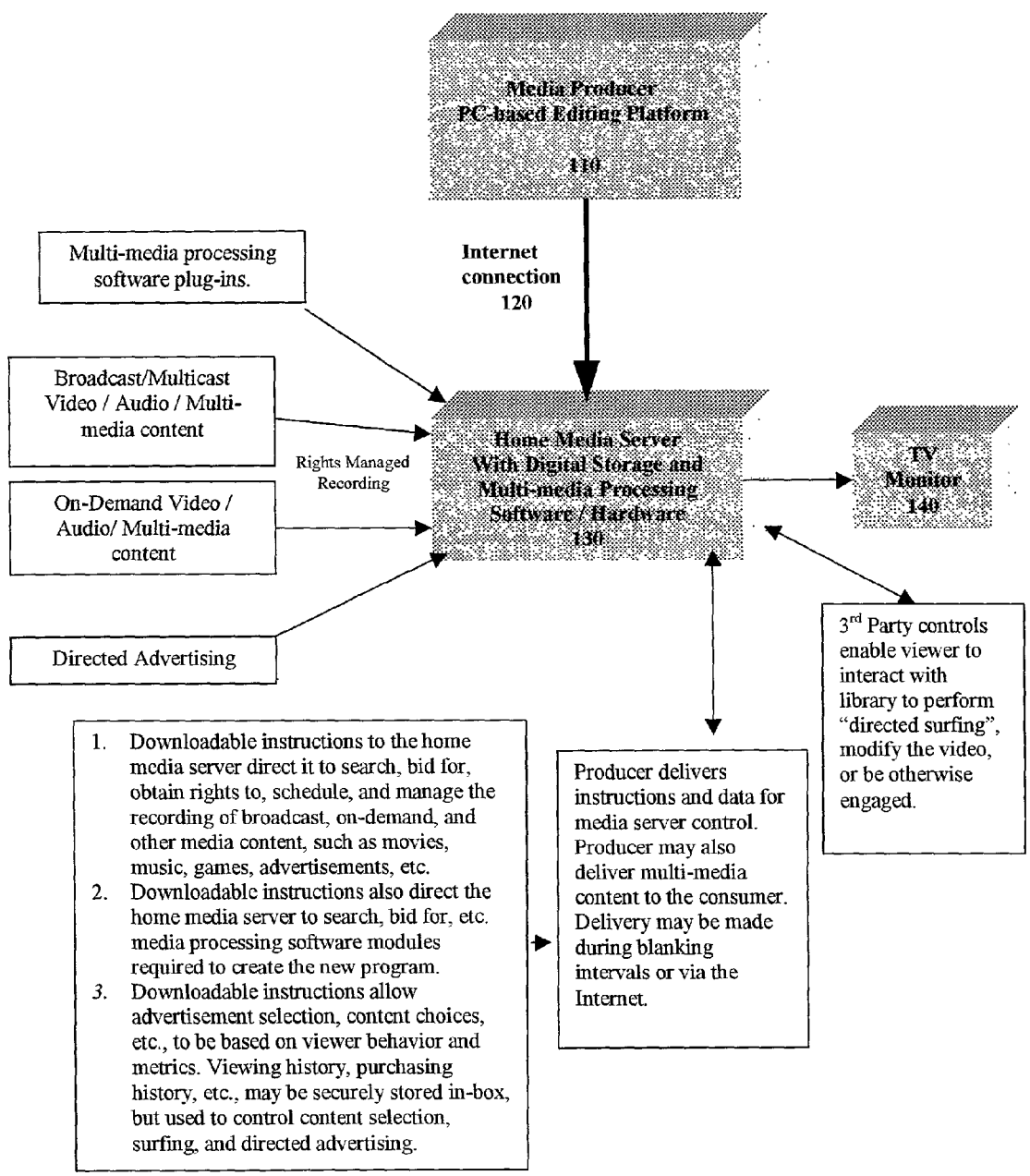
FIG. 1 illustrates a home media server content management and processing system according to an embodiment of the present invention.

FIG. 1 illustrates a home media server content management and processing system. A media producer using an editing platform 110 running editing software, creates and stores a database containing producer specified multi-media content. The producer generates a set of instructions and data to assemble an edited program using specified segments from the multi-media content database. The assembled edited program is viewed real-time and stored on the storage medium of the editing platform 110. The set of instructions, data, and multi-media content in the public domain or that the producer has secured rights to, are distributed via the Internet, or other connection, to home media servers 130.

A home media server 130 receives the set of instructions, data, and multi-media content from the editing platform 110 via the Internet 120 or other connection. The home media server 130 emulates the assembly of the edited program using the set of instructions, data, and multi-media content, displays the assembled edited program in real-time on a monitor 140, and stores the assembled edited program in the home media server 130.

Figure 2:
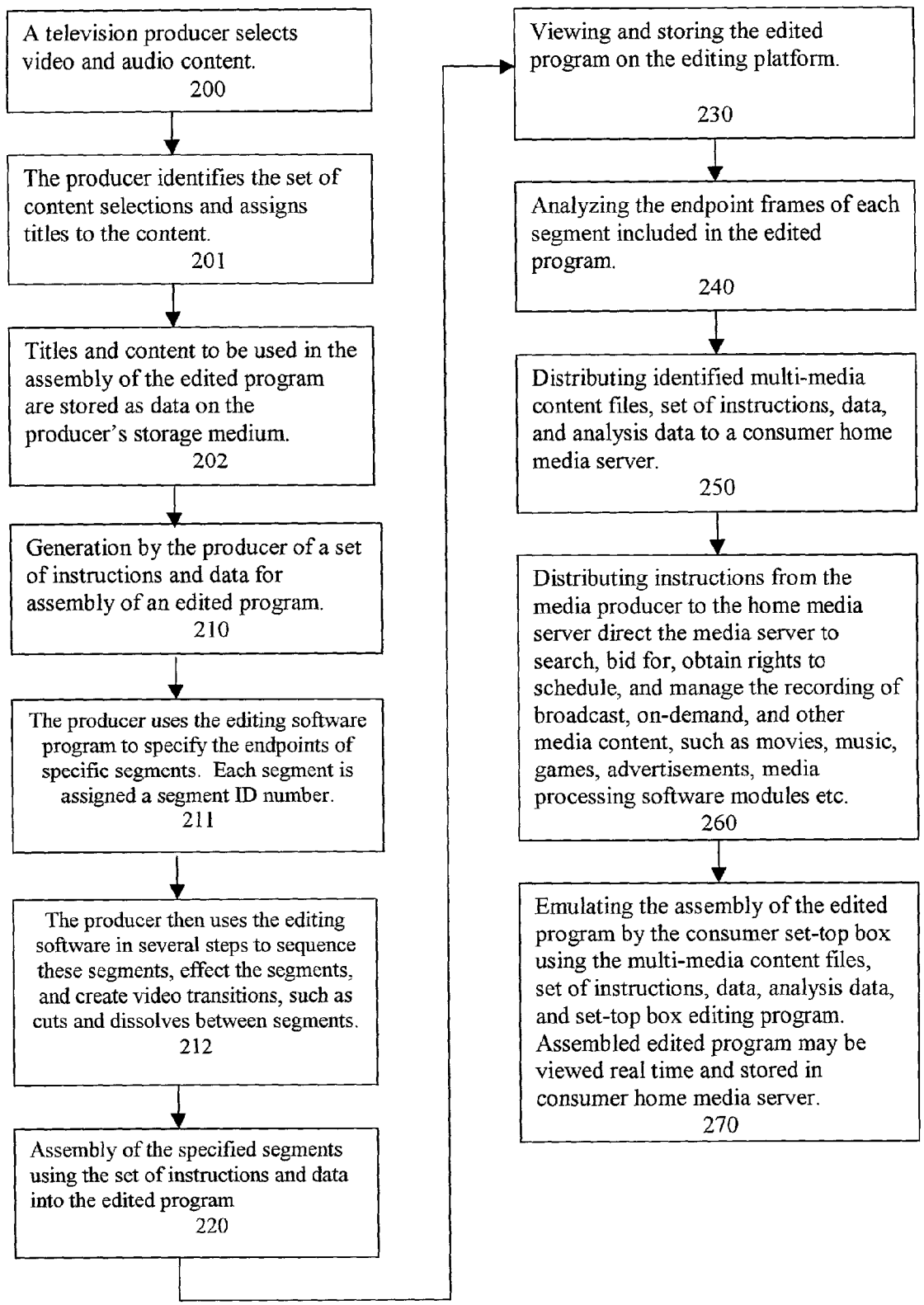
FIG. 2 illustrates a flow chart diagram of a method for providing home media server content management and processing according to an embodiment of the present invention.

FIG. 2 illustrates a flow chart diagram of a method for providing home media server content management and processing according to an embodiment of the present invention. A television producer selects 200 video and audio content, such as original works of art or movies and music that are available to the public, in the public domain, or that the producer has secured rights to, for instance, through downloaded files over the Internet.

The titles identifying 201 the set of content selections (such as movie and song titles), as well as the content that will be used in the assembly of the edited program are stored 202 as data files on the producer's storage medium within his/her editing platform. Sample systems may include a Pentium IV PC, Apple McIntosh or any equivalent computer-based editing platform running video-editing software, such as Avid, Adobe Premiere or other equivalent software. The producer may also create original video, audio, and software, and integrate them into a new program as well. Such content is also stored as media files on the producer's storage medium within his editing platform. Content files may be stored in various media formats, such as Moving Pictures Experts Group 4, also known as MPEG4 (specification ISO/IEC JTC1/SC29/WG11 N4030, International Organisation for Standardisation Organisation Internationale De Normalisation, published March 2001) and MP3, a subset of MPEG1 (specification ISO/IEC JTC1/SC29/WG11 NMPEG 96, International Organisation for Standardisation Organisation Internationale De Normalisation, published June 1996).

The producer generates 210 a set of instructions and data for the assembly of an edited program. The producer uses the editing software program to specify 211 the endpoints of specific segments within those content files that will be used to assemble an edited video program. One sample set of segments may be specific scenes from several different movies starring a specific actor. Each segment is assigned 211 a segment ID number.

The producer then uses the editing software in several steps 212 to sequence these segments, and manipulate, i.e., effect the segments, and create video transitions, such as cuts and dissolves between segments. The producer may also mix and sequence several audio segments in a similar fashion. Methods for implementing such steps are known to those in the art.

A final edited video program, including audio, is then assembled 220 using these steps and stored for viewing 230 on the producer's computer. All these editing steps are stored 230 as a set of data, which is used by the producer's video-editing software to assemble the edited program. This same data is distributed 250 to home media servers over the Internet.

Analysis software running on the PC analyzes 240 the endpoint frames (e.g., the first and last $\frac{1}{30}^{th}$ sec.) of each segment that was used to create the edited program. The results of such analysis are stored as additional data to be distributed 250 to home media servers in like fashion. An example of such analysis may be the Fast Fourier Transform (FFT) of each endpoint frame, stored in the following format:

Title/segmentID/startFFT/endFFT

Video frames may be represented by two-dimensional FFTs, whereas audio frames may be represented by one-dimensional FFTs. Such transforms are well known to those in the art.

Alternatively, decimated versions of content endpoint frames may be used. The producer may distribute a small bit of untransformed content (e.g., 20 ms of audio or one frame of video) to allow the home server to correlate and find the end points.

Additionally, downloadable instructions 260 from the media producer to the home media server direct the media server to search, bid for, obtain rights to schedule and manage the recording of broadcast, on-demand, and other media content, such as movies, music, games, advertisements, etc. The media producer may also deliver downloadable instructions 260 to direct the home media server to search, bid for, etc., media processing software modules required to create the edited program.

In another embodiment of the present invention, downloadable instructions 260 allow advertisement selection, content choices, etc., to be based on viewer behavior and metrics. Viewing history, purchasing history, etc., may be securely stored in the home media server, but used to control content selection, surfing, and directed advertising.

Home media servers, having downloaded this data, may now use this data to emulate 270 the steps taken by the producer outlined above to assemble an edited program similar to that specified by the producer.

The editing steps of the producer are saved and used to create a set of instructions for the home media servers. These instructions instruct a home media server to "emulate," 270, i.e. repeat the steps taken by the producer. Certain messages allow the home server to find the video and audio "raw" content specified. If the content is not found on the home server, or delivered via the Internet from the producer, it may downloaded from remote content servers. Other messages direct the home server to synchronize, edit, and combine the raw content selections in virtually the same way as the producer and to output the resulting data stream output for display.

Using this method, the home media server only emulates the content selection, ordering, and processing choices of the producer. No copyright restricted material is transferred from producer to consumer. In fact, the consumer is viewing content that he/she has a right to view. In this process, the new work of art is a set of content selecting, time-shifting, processing, and combining instructions used to control how home media servers playback the content.

Figure 3:
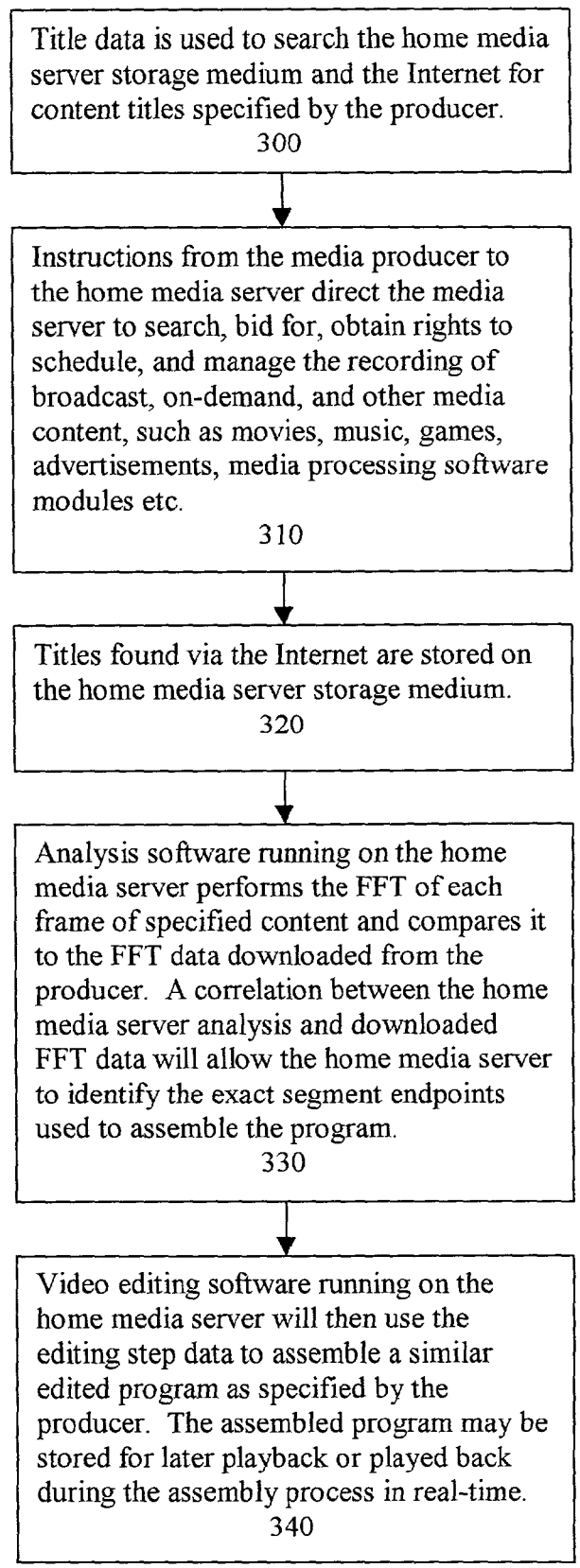
FIG. 3 illustrates a flow chart for emulation by a home media server of steps taken by a producer to create an edited program according to an embodiment of the present invention.

FIG. 3 illustrates a flow chart for home media server emulation of steps taken by a producer to create an edited program. Title data is used to search 300 the home media server storage medium and the Internet, for example, for content titles specified by the producer. Instructions 310 from the media producer to the home media server direct the home media server to search, bid for, obtain rights to schedule, and manage the recording of broadcast, on-demand, and other media content, such as movies, music, games, advertisements, etc. If titles are found via the Internet, they are stored on the home media server storage medium 320.

After all titles are found, analysis software 330 running on the home media server performs the FFT of each frame of the specified content and compares it to the FFT data downloaded from the media producer. A correlation between the home media server analysis and downloaded media producer FFT data allows the home media server to identify the exact segment endpoints used to assemble the program.

Alternatively, decimated versions of content endpoint frames may be used to perform the correlation. The small bits of untransformed content (e.g., 20 ms of audio or one frame of video) distributed by the media producer may allow the home server to perform a correlation to find the end points.

Video editing software running on the home media server uses the editing step data to assemble 340 a similar edited program as specified by the producer. The assembled program may be stored for later playback, or played back during the assembly process in real-time.

In summary, the present invention allows instructions from media producers to control home media servers in a way that adds value to home content libraries. A home media server, such as a set-top box, manages and processes consumer content, such as movies and music. The home media server only emulates the content selection, ordering, and processing choices of the media producer. For example, a producer may create a documentary on New York in the 1940's using images stored from home documentaries on jazz and World War II combined with home stored music. The producer may also download to the consumer original voiceover content. The consumer is viewing content that he/she has a right to view. In this process, the new work of art is a set of content selecting, time-shifting, processing, and combining instructions used to control how home media servers playback the content. This method enables media producers to use home stored recordings as an open source of content on top of which they can create new layers of media products for the public While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A home media server content management and processing system, comprising:
    an editing platform running editing software;
    a database, contained in the editing platform, to store media producer specified multi-media content;
    a set of downloadable instructions and data generated by a media producer to assemble an edited video program using a plurality of segments of the multi-media content;

a network to distribute the set of downloadable instructions, the edited set of data and analysis data generated by the media producer to home media servers;

a home media server to receive the set of downloadable instructions, the edited set of data and the analysis data generated by the media producer from the editing platform via the network, wherein the downloadable instructions, when executed by a processor, cause the home media sever to search for and bid for media content, to obtain rights to the media content based on the bidding, and to obtain the additional media content associated with the edited video program, and emulate assembly of the edited video program using, the media content obtaining utilizing the downloadable instruction files and the edited set of data, and wherein emulating assembly of the edited video program includes utilizing analysis software, the analysis software including instructions which when executed by a processor cause the home media server to perform fast fourier transform (FFT) of each frame of the specified segments from the files of the media content and to compare the home media server fast fourier transform (FFT) to downloaded media producer fast fourier transform (FFT) data, wherein a correlation between the home media server fast fourier transform (FFT) and the downloaded media producer fast fourier transform (FFT) data allows the home media server to identify exact segment endpoints used to assemble the edited video program.

2. The home media server content management and processing system according to claim 1, wherein the assembled edited video program is stored in the home media server.

3. An editing platform, comprising:
a non-transitory storage medium; and machine-readable code, stored on the storage medium, having instructions, which when executed cause the editing platform to receive a plurality of segments of video programs, each of the plurality of segments being identified by endpoints;
assemble the plurality of segments using the set of instructions to form the edited video program;
generate an edited set of data corresponding to editing steps for assembly of the edited video program;
store the edited video program on the editing platform, analyze endpoint frames of each segment used in the assembly of the edited program, generate analysis data corresponding to the endpoint frames of each segment used to create edited video program, the analysis data included media producer fast fourier transform (FFT) data;
generate downloadable instructions, the downloadable instructions, which when executed, request a media server to search for and bid for media content, to obtain rights to the media content based on the bidding, and to obtain the media content associated with the edited video program distribute the downloadable instructions, the edited set of data and the analysis data to a home media server, the downloadable instructions, which when executed, cause the media server to emulate assembly of the edited video program using the media content, wherein emulating assembly of the edited video program includes utilizing analysis software, the analysis software including instructions which when executed by a processor cause the home media server to perform fast fourier transform (FFT) of each frame of the specified segments from the files of the media content and to compare the home media server fast fourier transform (FFT) to downloaded media producer fast fourier transform (FFT) data, wherein a correlation between the home media server fast fourier transform (FFT) and the downloaded media producer fast fourier transform (FFT) data allows the home media server to identify exact segment endpoints used to assemble the edited video program.

4. The editing platform according to claim 3, wherein each set of said endpoint segments assigned a segment identification (ID) number.

5. The editing platform according to claim 3, wherein generation of the set of instructions for assembly of the edited video program includes manipulating and sequencing of the plurality of segments by the media producer using the editing software program, said manipulation including creating and storing a set of manipulation instructions, said sequencing including producing and storing a sequence order.

6. The editing platform according to claim 5, wherein the manipulation instructions include instructions to effect the plurality of segments, and to create transitions between the plurality of segments using the editing software program.

7. The editing platform according to claim 5, wherein assembling the plurality of segments includes using the sequence order, segment identification (ID) numbers, manipulation instructions, and the editing software program to produce the edited program.

8. The editing platform according to claim 3, wherein the multi-media content includes movies and music available through downloaded files via the Internet.

9. The editing platform according to claim 3, wherein identification includes assigning titles, said titles stored as title data on the storage medium within the editing platform.

10. The editing platform according to claim 3, wherein the multi-media content is stored as media files on the storage medium within the editing platform.

11. The editing platform according to claim 10, wherein the media files are stored in various media formats, where video is stored as MPEG4 and audio is stored as MP3.

12. The editing platform according to claim 3, wherein a video frame is represented by a two-dimensional fast fourier transform (FFT), and a audio frame is represented by a one-dimensional fast fourier transform (FFT).

13. The editing platform according to claim 3, wherein the distribution is via the Internet.

14. The editing platform according to claim 3, wherein the assembled edited video program is viewed real time and stored in the home media server.

15. An editing platform, comprising:
a processor;
a non-transitory storage medium; and
machine-readable code, stored on the storage medium, having instructions, which when executed cause the editing platform to
receive a plurality of segments of video programs, each of the plurality of segments being identified by endpoints;
assemble the plurality of segments using the set of instructions to form the edited video program;
generate an edited set of data corresponding to editing steps for assembly of the edited video program;
store the edited video program on the editing platform,
analyze endpoint frames of each segment used in the assembly of the edited program,
generate analysis data corresponding to the endpoint frames of each segment used to create edited video program, the analysis data including a decimation of each end point frame to form media producer decimated data;
generate downloadable instructions, the downloadable instructions, which when executed by a processor on the media server, request the media server to search for and bid for media content, to obtain rights to the media content based on the bidding, and to obtain the additional media content associated with the edited video program;

distribute the downloadable instructions, the edited set of data and the analysis data to a home media server, the downloadable instructions, which when executed cause the media server to emulate assembly of the edited video program using the media content, herein emulation of the edited video program includes utilizing analysis software, the analysis software including instructions which when executed by the processor of the home media server cause the home media server to perform a decimation of each frame of the specified segments from the files of the media content to form home media server decimated data and to compare the home media decimated data to downloaded media producer decimated data, wherein a correlation between the home media server decimated data and the downloaded media producer decimated data allows the home media server to identify exact segment endpoints used to assemble the edited video program.

16. A home media server, comprising;
a processor,
a non-transitory storage medium; and
machine-readable code, stored on the storage medium,
receive downloadable instructions, an edited set of data and analysis data from a media producer computer, the analysis data including media producer fast fourier transform (FFT) data,
the downloadable instructions, which when executed by the processor, cause the home media server to search for and bid for media content, to obtain rights to the media content via the bidding, and to obtain the media content associated with an edited video program, the edited set of data corresponding to editing steps for assembly of the edited video program, and the analysis data corresponding to the endpoint frames of each segment used to create the edited video program; and
emulate assembly of the edited video program using the media content obtained utilizing the downloadable instructions files and the edited set of data,
wherein emulation of the assembly of the edited video program includes using analysis software, the analysis software including instructions, which when executed by the processor cause the home media server to perform fast fourier transform (FFT) of each frame of the specified segments from the files of the media content and to compare the home media server fast fourier transform (FFT) to downloaded media producer fast fourier transform (FFT) data, wherein a correlation between the home media server fast fourier transform (FFT) and the downloaded media producer fast fourier transform (FFT) data allows the home media server to identify exact segment endpoints used to assemble the edited video program.

17. The home media server according to claim 16, wherein emulation of the assembly of the edited video program includes using title data to search a home media server storage medium and the Internet for multi-media content titles specified by the media producer.

18. A home media server, comprising:
a processor,
a non-transitory storage medium; and
machine-readable code, stored on the storage medium,
receive, at the home media server, downloadable instructions, an edited set of data and analysis data from a media producer computer, the analysis data including media producer decimated data;
the downloadable instructions, when executed by the processor, cause the home media server to search or and bid for media content to obtain rights to the media content via the bidding, and to obtain the media content associated with an edited video program, the edited set of data corresponding to editing steps for assembly of the edited video program, and the analysis data corresponding to the endpoint frames of each segment used to create the edited video program; and
emulate assembly of the edited video program using the media content obtained utilizing the downloadable instructions files and the edited set of data,
wherein emulating assembly of the edited video program includes using analysis software, the analysis software including instructions, which when executed cause the home media server to perform a decimation of each frame of the specified segments from the files of the media content to form home media server decimated data and to compare the home media decimated data to downloaded media producer decimated data, wherein a correlation between the home media server decimated data and the downloaded media producer decimated data allows the home media server to identify exact segment endpoints used to assemble the edited video program.

19. The home media server according to claim 18, wherein emulation of the assembly of the edited video program includes using title data to search a home media server storage medium and the Internet for multi-media content titles specified by the media producer.

* * * * *

UNITED STATES PATENT AND TRADEMARK OFFICE
CERTIFICATE OF CORRECTION

PATENT NO.         : 8,150,235 B2
APPLICATION NO.  : 10/071571
DATED             : April 3, 2012
INVENTOR(S)      : Chris Hamilton Page 1 of 1

It is certified that error appears in the above-identified patent and that said Letters Patent is hereby corrected as shown below:

Claim 1, Column 5, Line 8
replace "sever"
with --server--

Claim 15, Column 7, Line 8
replace "herein"
with --wherein--

Claim 18, Column 8, Line 20
replace "or"
with --for--

Signed and Sealed this
Thirty-first Day of July, 2012

David J. Kappos
*Director of the United States Patent and Trademark Office*